United States Patent [19]
McFadden et al.

[11] Patent Number: 5,746,419
[45] Date of Patent: May 5, 1998

[54] ENERGY ABSORBING DEVICE

[75] Inventors: James Robert McFadden, Oxford; Joseph Paul Greene, West Bloomfield; Michael James Bland, Oxford, all of Mich.

[73] Assignee: General Motors Corporation, Detroit, Mich.

[21] Appl. No.: 732,194

[22] Filed: Oct. 16, 1996

[51] Int. Cl.$^6$ .............................. B60R 19/02; F16F 1/36
[52] U.S. Cl. ................................. 267/140; 188/377
[58] Field of Search ........................ 267/80, 219, 35, 267/294, 116, 139, 140, 140.3, 140.4, 141, 141.1, 141.6, 145, 152, 181; 293/132, 136, 133; 188/377

[56] References Cited

U.S. PATENT DOCUMENTS

| | | | |
|---|---|---|---|
| 3,933,387 | 1/1976 | Salloum et al. | 267/140 X |
| 3,997,207 | 12/1976 | Norlin | 293/71 R |
| 4,029,350 | 6/1977 | Goupy et al. | 293/71 R |
| 4,193,621 | 3/1980 | Peichl et al. | 293/142 |
| 4,221,413 | 9/1980 | Bonnetain | 188/377 X |
| 4,227,593 | 10/1980 | Bricmont et al. | 188/377 |
| 4,573,724 | 3/1986 | Campen | 293/136 |
| 4,635,981 | 1/1987 | Friton | 293/1 |
| 4,856,833 | 8/1989 | Beekman | 293/120 |
| 5,219,197 | 6/1993 | Rich et al. | 293/120 |
| 5,273,330 | 12/1993 | Petry et al. | 293/132 |
| 5,290,078 | 3/1994 | Bayer et al. | 293/120 |
| 5,306,068 | 4/1994 | Nakae et al. | 296/189 |
| 5,425,561 | 6/1995 | Morgan | 293/120 |

FOREIGN PATENT DOCUMENTS

| | | | |
|---|---|---|---|
| 2375496 | 9/1978 | France | 267/139 |
| 2436205 | 2/1975 | Germany | 267/139 |
| 3839976 | 5/1990 | Germany | 293/132 |

*Primary Examiner*—Josie Ballato
*Attorney, Agent, or Firm*—Jeffrey A. Sedlar

[57] ABSTRACT

An energy absorbing device includes an energy absorber element having a plurality of elongated hollow hexagonal cells. The cells are arranged in a block shape with first and second layers interconnected by an intermediate plate. The intermediate plate closes adjacent ends of the first and second layers and forms three-sided pyramidal structures which project into each individual cell of the first and second layers. Each pyramidal structure has an apex located near the center of each cell. The energy absorber element is deformable under impact loading conditions to absorb and dissipate energy. Upon the removal of the impact load the energy absorber element returns to its original shape.

11 Claims, 6 Drawing Sheets

ENERGY ABSORBING DEVICE

TECHNICAL FIELD

The present invention relates to an energy absorbing device and more particularly, to an energy absorbing device that dissipates impact induced energy and exhibits a desirable load versus deflection performance characteristic.

BACKGROUND OF THE INVENTION

An energy absorbing device is typically used in a vehicular bumper system. Such a bumper system consists of an impact beam and an energy absorber. The impact beam is generally mounted to the frame or support structure of the associated vehicle with fasteners or other suitable attachment means. Impact beams are designed to resist deformation during impact and to reduce permanent deformation of the vehicle's body, including its components. The energy absorber absorbs the load during impact as the bumper system displaces, which dissipates kinetic energy. Known energy absorbers include hydraulic units, foam absorbers and composite structures. A fascia formed from a pliable material is generally fitted over the energy absorber to provide an attractive outer surface for the bumper system.

Conventional composite structure energy absorbers are typically made of a thermoplastic material. The material is often polyethylene thermoplastic that is formed with high pressure injection molding machines. The tooling required to form such an energy absorber is complicated and requires a long lead time for the tooling to be fabricated. Additionally costly injection molding machines are required.

Known composite structure energy absorbers also require relatively large offsets to body surfaces. This interjects design constraints into the outward appearance of the bumper system by requiring the bumper to project a substantial distance from the protected body components. It is preferable that a bumper system's design direction be determined by styling selection. Therefore, economical energy absorbers of the composite structure type are needed with higher stiffness and higher strengths to reduce system deflection and to protect the body during impacts without excessively inhibiting the styling options.

SUMMARY OF THE INVENTION

The present invention provides an energy absorbing device with a desirable load versus deflection performance characteristic curve. The energy absorbing device includes a composite structure energy absorber element. The energy absorber element is constructed from low pressure reaction injection molding (RIM) of a urethane material. This may be accomplished using relatively low cost and short lead time tooling as opposed to the more costly steel tooling required for prior art injection molded designs.

The energy absorber element's structure is characterized by two layers of a hexagonal cell arrangement, separated by a relatively thin transverse plate. The structure is preferably arranged with an offset at the plate between the two layers but is optionally arranged with the layers aligned longitudinally. This provides a system for efficient energy management during impact of approximately 60 percent efficiency.

In accordance with a first preferred embodiment of the present invention, an energy absorbing device includes an impact beam and an energy absorber element covered by a soft fascia. The impact beam comprises a rigid elongated structure which is adapted for attachment to a vehicle's rails. A plurality of energy absorber elements are mounted to the impact beam. Each energy absorber element includes a plurality of elongated hollow hexagonal cells arranged in a pair of layers. The layers are connected by an intermediate plate that closes adjacent ends of the celled layers.

In accordance with a second preferred embodiment of the present invention an energy absorbing device includes an impact beam that is mounted to at least one hydraulic energy absorber element which is adapted for mounting to a vehicle's structure. The hydraulic energy absorber element includes a pair of plates which are movable relative to each other against hydraulic resistance. A second energy absorber element having a plurality of elongated hollow hexagonal cells arranged in a pair of layers is positioned between the plates of the hydraulic energy absorber element. The layers of the celled energy absorber element are interconnected by an intermediate plate that closes adjacent ends of the layers. Impact forces causing a deflection of the impact beam operate against both the hydraulic energy absorber element and the celled energy absorber element which act together to dissipate the kinetic energy.

DETAILED DESCRIPTION OF THE PRESENTLY PREFERRED EMBODIMENTS

Figure 1:
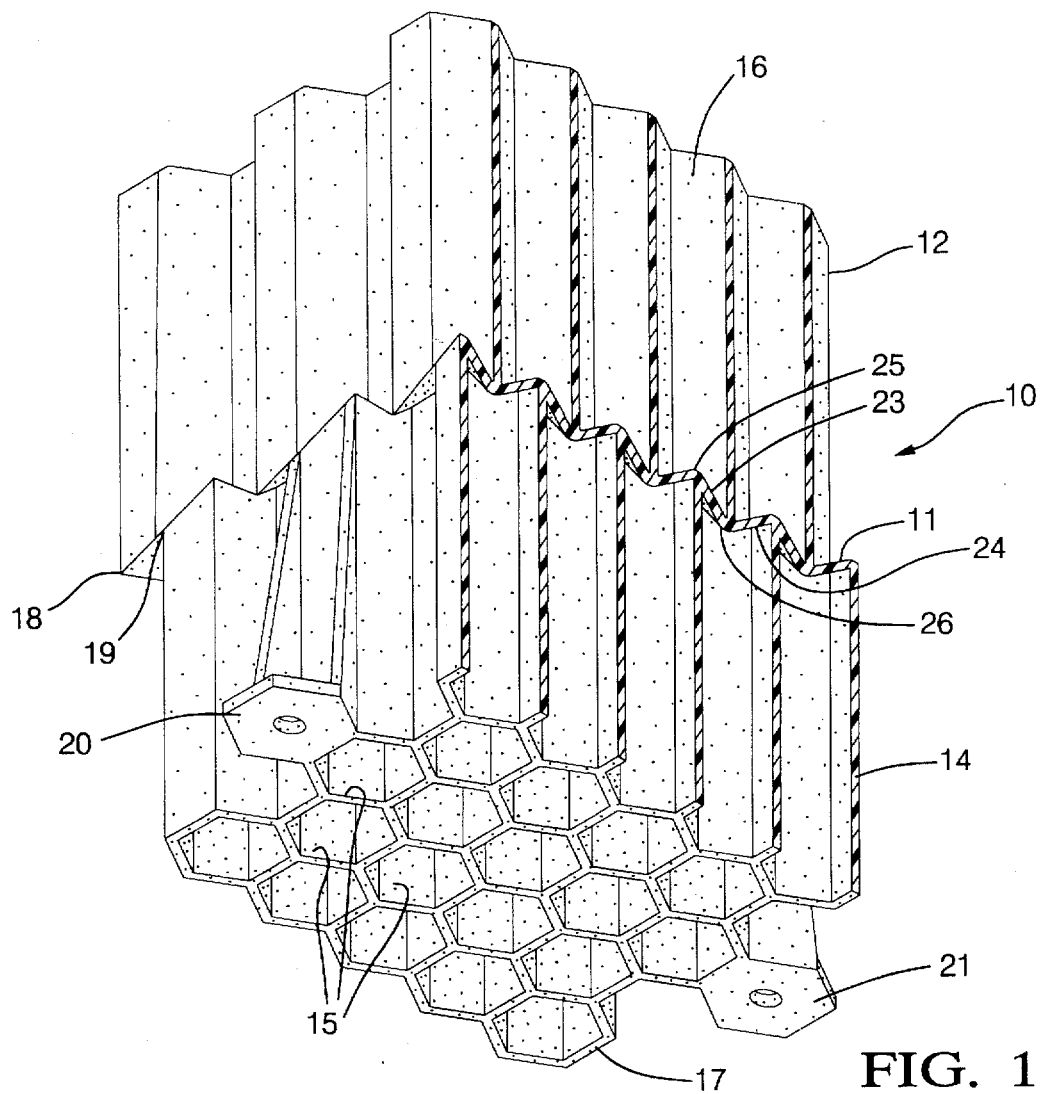
FIG. 1 is a fragmentary perspective illustration of a celled energy absorber element.
Figure 2:
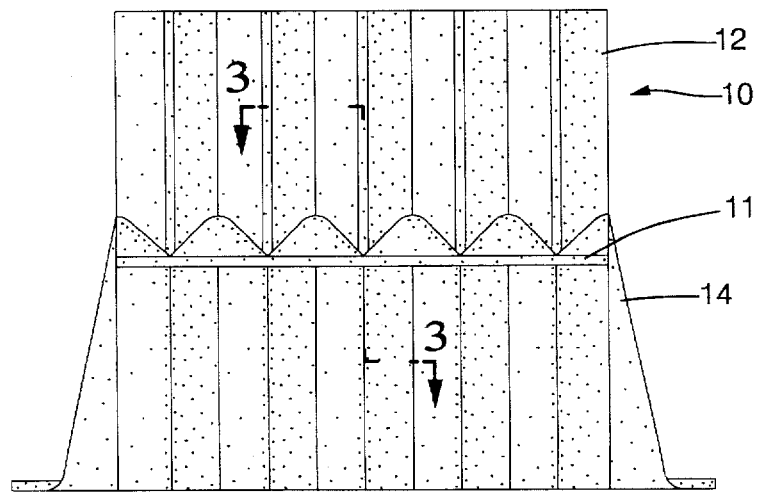
FIG. 2 is a side view of the celled energy absorber element of FIG. 1.

Referring to the drawings, illustrated in FIGS. 1 and 2 is a celled energy absorber element designated as block 10. Block 10 comprises a one-piece structure which includes two distinct layers designated as 12 and 14. Each of the layers 12 and 14 are made up of a plurality of elongated hollow hexagonal cells positioned adjacent each other. A representative cell is designated as cell 15 and includes the six walls surrounding the hollow center. For cell 15, each of the six walls are shared with adjacent cells.

Layers 12 and 14 are interconnected by an intermediate plate 11. Layer 12 includes an end 16 wherein each of the individual cells is open. Layer 14 also includes an end 17 wherein each of the individual cells is open. The layers 12 and 14 come together at the intermediate plate 11 which closes the adjacent ends 18 and 19 of the layers 12 and 14, respectively. Layer 14 includes a pair of integrally molded mounting brackets 20 and 21 each of which includes a pair of walls supporting a hexagonal shaped plate at the end 17 of layer 14. The layers 12 and 14 are arranged in this preferred embodiment such that the individual cells thereof, are offset relative to one another across the intermediate plate 11.

The intermediate plate 11 forms a three-sided pyramidal structure projecting into each individual cell of the layers 12 and 14. The pyramidal structures 23 and 24 are exemplary. Each of the pyramidal structures, including pyramidal structures 23 and 24 has an apex, such as the apexes 25 and 26, respectively. Each apex is located substantially in a centered position within the associated hexagonal cell. This provides a high strength structure with good deflective characteristics.

Figure 3:
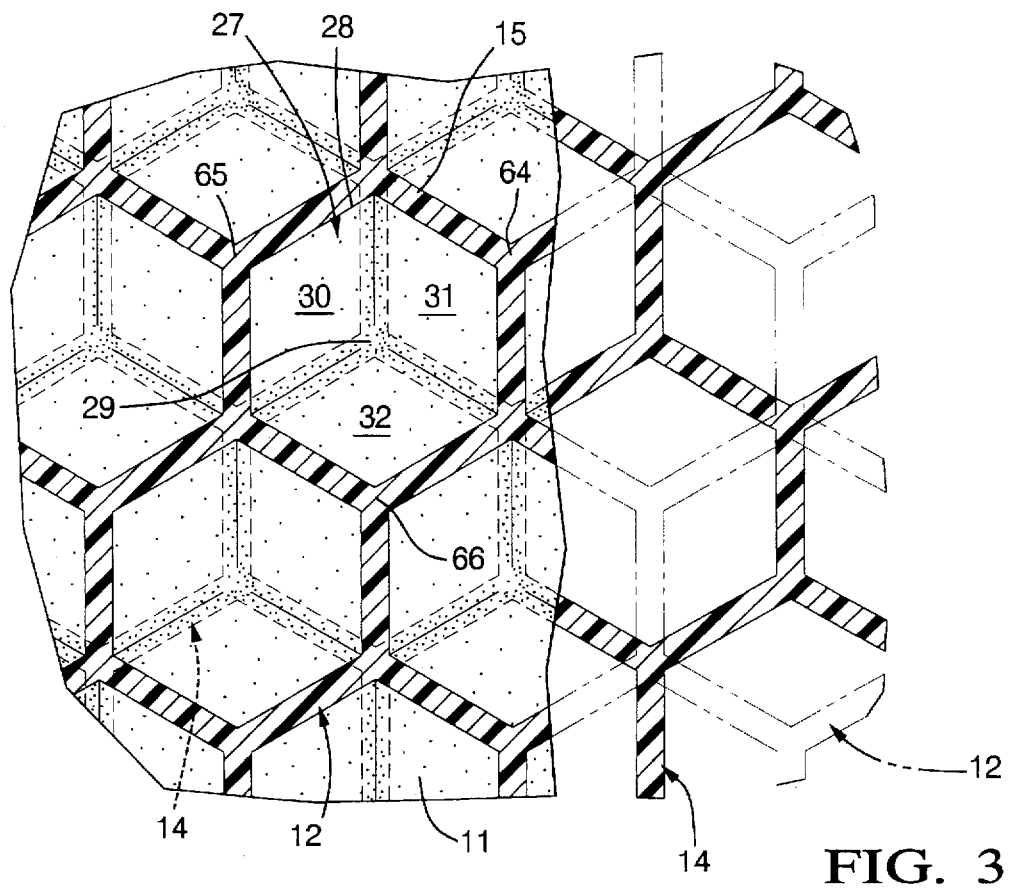
FIG. 3 is a fragmentary cross sectional illustration taken generally through the plane indicated by the line 3—3 in FIG. 2.

Referring to FIG. 3, the relative offset between the layers 12 and 14, and the apex locations are more readily apparent. Each pyramidal structure, for example pyramidal structure 27, includes a jagged hexagonal base 28 formed by the six walls of the associated cell 15 of layer 12. The pyramidal structure 27 also includes three sides 30–32. The three sides 30–32 adjoin one another and form an apex 29 which projects into and is centered within the cell 15. The walls of the cell 15 intersect at various points including the points 64–66. The points 64–66 form three apexes on the opposite side of intermediate plate 11 in cells of the layer 14.

The block 10, including layers 12 and 14 and the intermediate plate 11, is preferably formed in one piece through the known process of reaction injection molding using a urethane material. Optionally, the block 10 may be formed through the known process of injection molding. The block 10 is formed using known epoxy tooling with typical draft angles, molding wall thickness selection and gate size and types. By means of incorporating the intermediate plate 11, filling of the individual cells within the layers 12 and 14 is facilitated during the molding process. By using a RIM process, the block 10 is produced using relatively low cost tooling that is itself readily produced.

Figure 5:
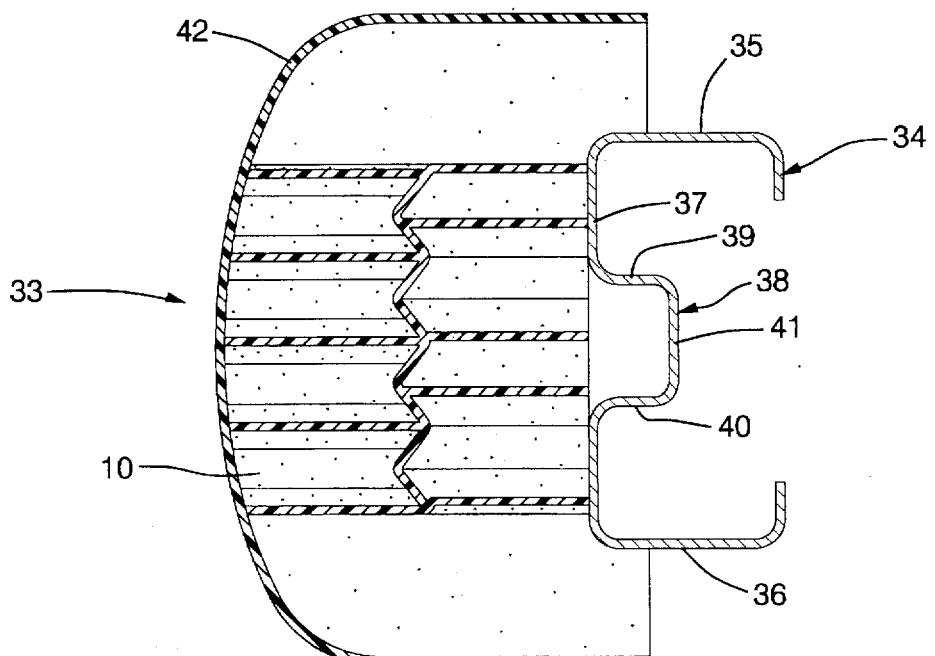
FIG. 5 is a fragmentary cross sectional illustration taken generally through the plane indicated by the line 5—5 in FIG. 4.
Figure 4:
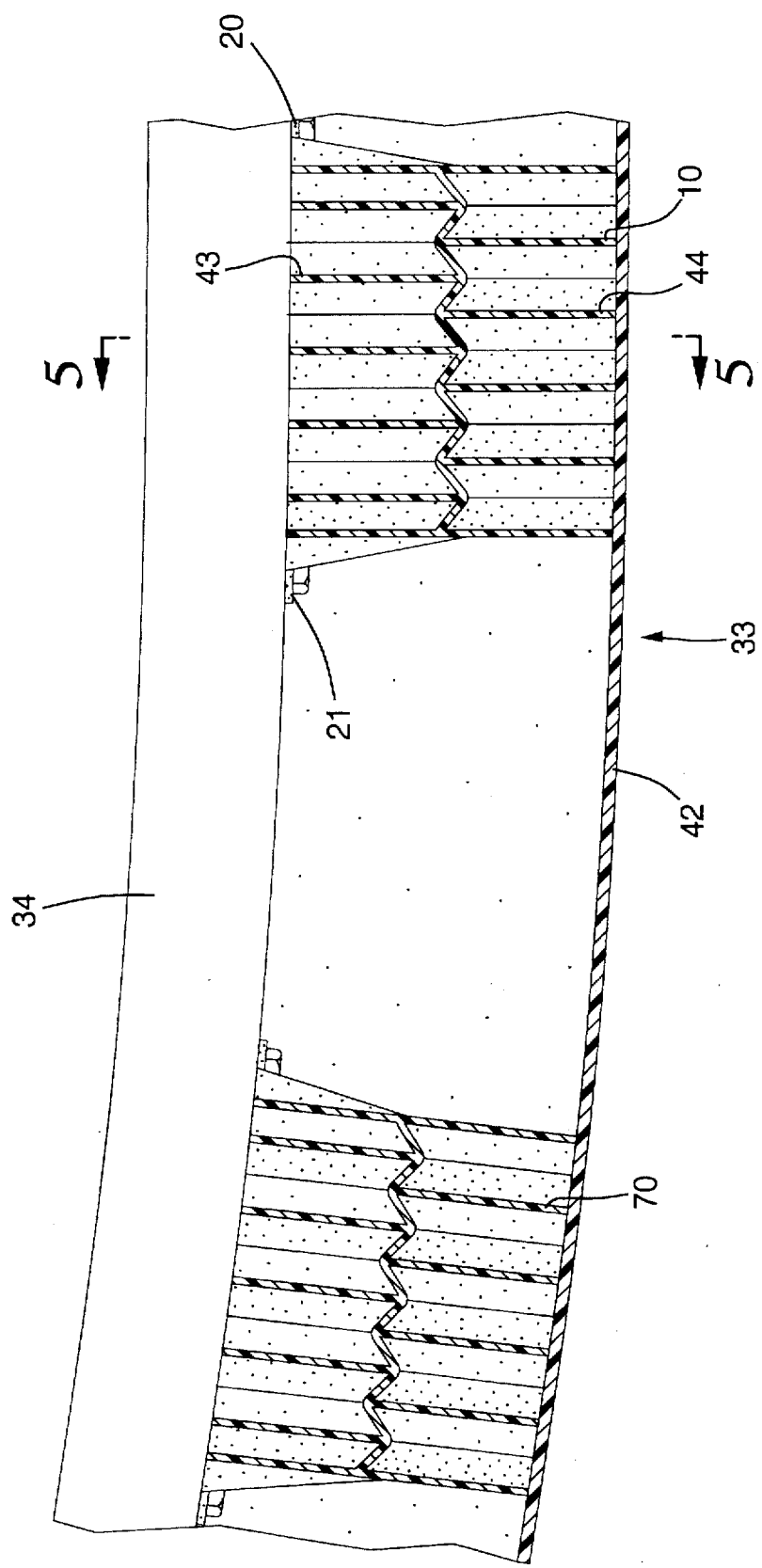
FIG. 4 is a fragmentary cross sectional illustration of the celled energy absorber element of FIG. 1 installed in a vehicle bumper system.

Referring to FIGS. 4 and 5, a bumper system 33 utilizing the block 10 is illustrated. The impact beam 34 is formed from a conventional material that is suitably capable of resisting deformation during the application of impact forces. Impact beam 34 includes first and second horizontal walls 35 and 36 that are connected together by a front vertical wall 37. A central channel 38 is formed in the vertical wall 37 by third and fourth substantially horizontal walls 39 and 40 and a rear vertical wall 41. Preferably, the impact beam 34 is formed of an integral one-piece construction. The design and configuration of the impact beam 34 can vary as dictated by the particular application for the bumper system 33.

A plurality of celled energy absorbing elements including blocks 10 and 70 are mounted on an impact beam 34 at selected locations dictated by the specific application. A typical application may call for 2–5 such blocks. Blocks 10 and 70 are attached to the impact beam 34 by a suitable fasteners which operate with the integral mounting brackets 20 and 21 of block 10 and the like brackets of block 70. The blocks 10 and 70 support a soft fascia 42 which is designed to provide a stylish covering for the bumper system 33.

The celled energy absorbing elements and specifically the blocks 10 and 70, operate to dissipate energy during an impact on the fascia 42. The exemplary walls 43 and 44 of the individual hexagonal cells are adapted to buckle along their lengths when subjected to impact loads dissipating energy. In addition, the pyramidal structure of the intermediate plate 11 permits lateral movement of the wall ends at ends 18 and 19 of the layers 12 and 14, adjacent the intermediate plate 11. After impacts up to a certain threshold level, the cells gradually recover to their pre-impact shape.

Figure 6:
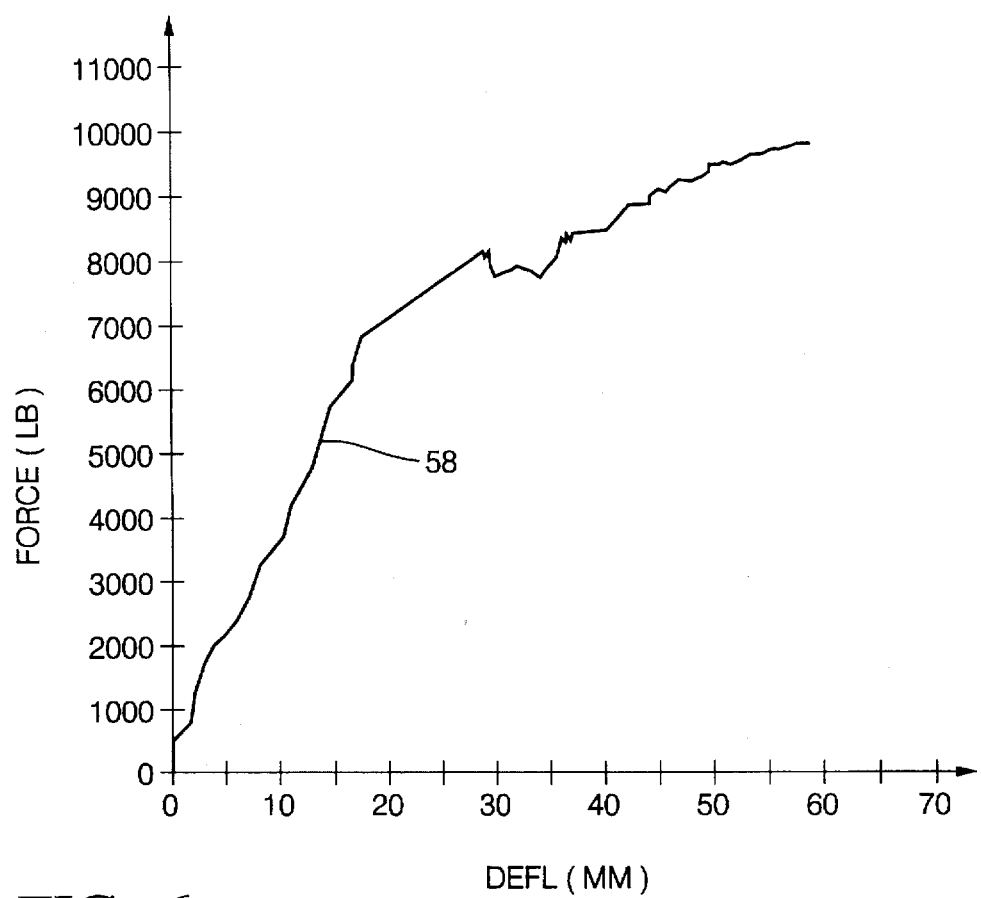
FIG. 6 is a performance curve of applied load versus deflection for the celled energy absorber element of FIG. 1.

Referring to FIG. 6, the performance of the block 10 is illustrated in graphical form. The vertical axis indicates applied loading force in pounds and the horizontal axis indicates displacement of the block 10 in millimeters. The curve 58 represents displacement for a given amount of loading. The graph demonstrates that a preferably shaped curve 58 is provided for the performance of the block 10. A relatively small amount of displacement occurs for a relatively significant amount of loading force. The performance curve 58, for a test sample of the material described as block 10, demonstrates good efficiency by withstanding 9,851 pounds of loading while deflecting 59 millimeters. The performance achieved during the generation of curve 58 provides for dissipation of 17,484 inch-pounds of energy.

Figure 7:
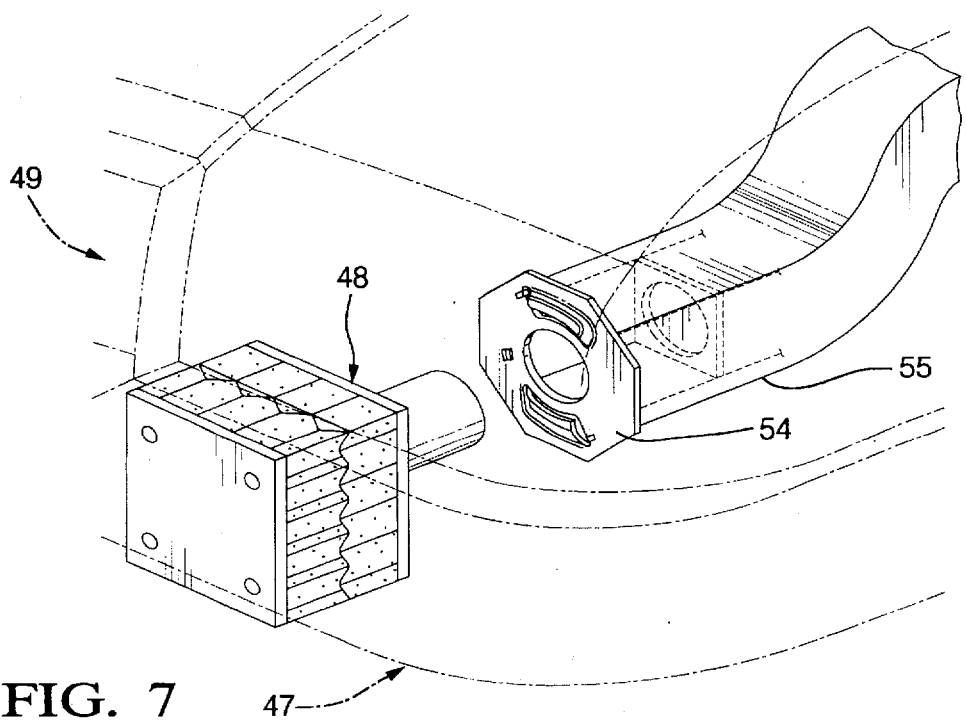
FIG. 7 is a partially exploded fragmentary perspective illustration of a second embodiment of the present invention.
Figure 8:
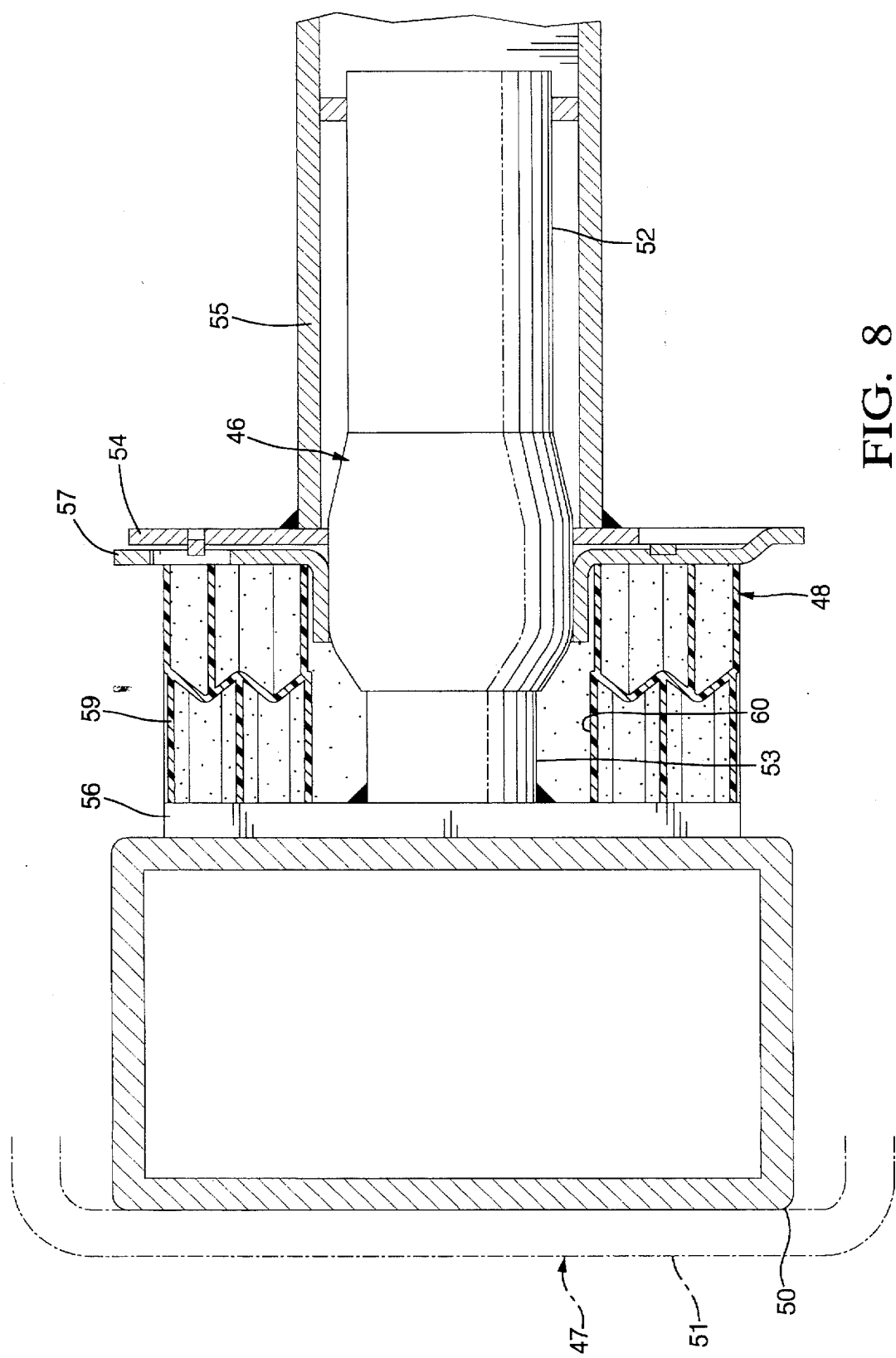
FIG. 8 is a fragmentary cross sectional illustration of the embodiment of the present invention illustrated in FIG. 7.

Referring to FIGS. 7 and 8, a second embodiment of the present invention is illustrated. A forward portion of a vehicle is indicated generally at 49 with a terminating front portion of side rail 55 also illustrated. A combination telescopic energy absorber unit indicated generally at 48 is adapted to be secured between the side rail 55 at mounting plate 54 and the bumper assembly 47. As shown in FIG. 8, the bumper assembly 47 includes an impact bar 50 with a covering 51.

The combination energy absorbing unit 48 includes a hydraulic energy absorber element 46 and a celled energy absorber element designated as block 59. The hydraulic energy absorber element 46 includes a cylinder 52 that carries a piston rod 53 for limited sliding movement within the cylinder 52 against hydraulic fluid force resistance.

A plate 57 for connection with the mounting plate 54 is attached to the cylinder 52 and a second plate 56 for mounting to the impact bar 50 is attached to the piston rod 53. Accordingly, the plates 56 and 57 will move toward each other upon the imposition of an impact force, as the piston rod 53 slides within the cylinder 52. The plates 56 and 57 will move away from each other when the impact force is removed, and the hydraulic fluid forces the piston rod 53 back to its at-rest position relative to the cylinder 52. The celled energy absorbing element designated as block 59 has a construction substantially the same as the block 10 of FIG. 1, and is mounted between the plates 56 and 57. An opening 60 is provided through the block 59 for receiving the hydraulic energy absorber element 46.

Upon the application of an impact force to the bumper system 47, the plate 56 moves toward the plate 47 against the force of the hydraulic energy absorber element 46 and the block 59 in combination. For an impact force up to a given threshold, the combination energy absorbing unit 48 returns to its pre-impact condition as illustrated, having dissipated the energy through deformation of the block 59 and heating of the hydraulic fluid in the cylinder 52.

Figure 9:
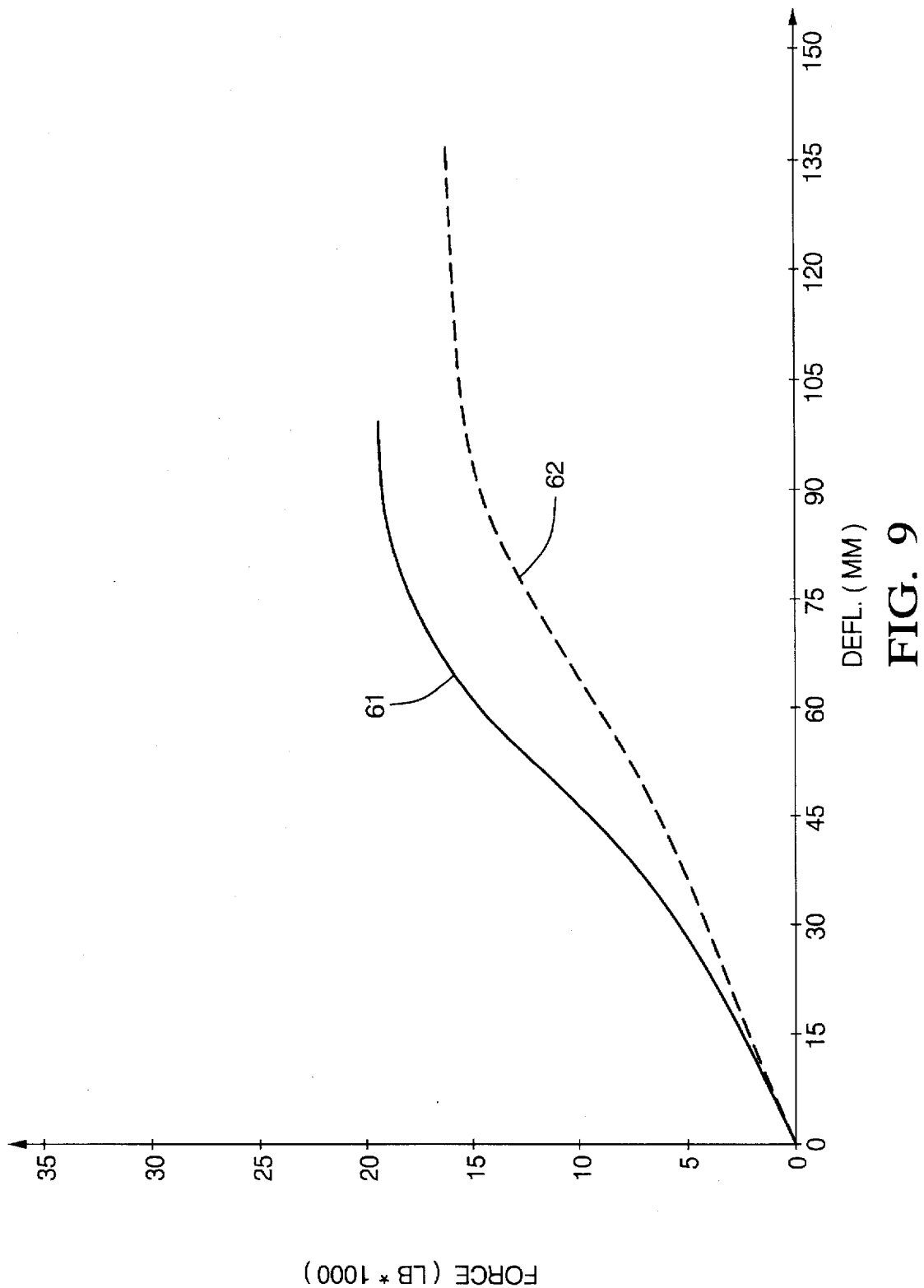
FIG. 9 is a performance curve of applied force versus deflection for the embodiment of the present invention illustrated in FIGS. 7 and 8.

Referring to FIG. 9, curve 61 graphs the performance of the combination energy absorbing unit 48, and in comparison curve 62 graphs the performance of the hydraulic energy absorber 46 alone without assistance from the block 59. As demonstrated by FIG. 9, the amount of deflection for the combination energy absorber unit 48 of FIG. 8 is substantially less for a given applied force as compared to the performance demonstrated by the curve 62. This provides the result that a greater amount of energy is dissipated by the telescopic energy absorbing unit. Optionally, a lower offset can be incorporated into the vehicle's design as a result of the enhanced performance.

We claim:

1. An energy absorbing device comprising:

a one-piece energy absorber element having a plurality of elongated straight sided hollow hexagonal cells arranged in a first layer and a second layer, the first and second layers interconnected by an intermediate plate of the one-piece energy absorber element so that the intermediate plate closes adjacent ends of the first and second layers with the cells of the first layer offset relative to the cells of the second layer.

2. An energy absorbing device according to claim 1 wherein the intermediate plate forms a three-sided pyramidal structure projecting into each cell of the first and second layers, the three-sided pyramidal structure of each cell having an apex located near the center of each cell.

3. An energy absorbing device comprising:

an impact beam element including a rigid elongated structure; and a plurality of energy absorber elements mounted to the impact beam, each energy absorber element comprising a one-piece structure and including a plurality of elongated straight sided hollow hexagonal cells arranged in a first layer and a second layer, the first and second layers interconnected by an intermediate plate so that the intermediate plate closes adjacent ends of the first and second layers with the cells of the first layer offset relative to the cells of the second layer wherein the intermediate plate forms a three sided pyramidal structure projecting into each cell of the first and second layers.

4. An energy absorbing device comprising:

an impact beam mounted to a hydraulic energy absorber element, the hydraulic energy absorber element including a cylinder carrying a first plate for connection to a vehicle body rail, and, a piston rod engaging the cylinder and carrying a second plate for connection to an impact beam wherein the plates are movable relative to each other; and a celled one-piece energy absorber element mounted between and engaging the first and second plates, and having a plurality of elongated hollow hexagonal cells arranged in a pair of layers positioned between the plates of the hydraulic energy absorber element, the layers of the celled energy absorber element interconnected by an intermediate plate that closes adjacent ends of the layers so that impact forces causing a deflection of the impact beam operate against both the hydraulic energy absorber element and the celled energy absorber element which cooperate together to dissipate energy.

5. An energy absorbing device comprising:

a one-piece celled block with a first layer and a second layer wherein each of the first and second layers includes a plurality of elongated hollow straight-sided hexagonal cells wherein the first and second layers are interconnected by an intermediate plate that closes a first adjacent end of the first layer and a second adjacent end of the second layer wherein the intermediate plate forms a pyramidal structure having three sides that project into each individual cell of the first and second layers wherein each pyramidal structure forms an apex that is located substantially in a centered position within a respective cell.

6. An energy absorbing device according to claim 5 further comprising a hydraulic energy absorber element including a cylinder carrying a first plate and a piston rod engaging the cylinder and carrying a second plate wherein the first and second plates are movable relative to one another, and wherein the one-piece celled block includes an opening that receives the hydraulic energy absorber element and extends between and engages the first and second plates.

7. An energy absorbing device according to claim 5 wherein the first layer includes a mounting bracket formed as one piece with the celled block wherein the mounting bracket includes a pair of angled walls supporting a mounting plate.

8. An energy absorbing device comprising:

a one-piece celled block with a first layer and a second layer wherein each of the first and second layers includes a plurality of elongated hollow hexagonal cells wherein the first and second layers are interconnected by an intermediate plate that closes a first adjacent end of the first layer and a second adjacent end of the second layer wherein the intermediate plate forms a pyramidal structure having three sides that project into each individual cell of the first and second layers wherein each pyramidal structure forms an apex that is located substantially in a centered position with a respective cell, and each pyramidal structure includes a jagged hexagonal base formed by an intersection of a corresponding six walls of the respective cell and the three sides of the pyramidal structure.

9. An energy absorbing device according to claim 8 further comprising a hydraulic energy absorber element including a cylinder carrying a first plate and a piston rod engaging the cylinder and carrying a second plate wherein the first and second plates are movable relative to one another, and wherein the one-piece celled block includes an opening that receives the hydraulic energy absorber element and extends between and engages the first and second plates.

10. An energy absorbing device comprising:

a one-piece celled block with a first layer and a second layer wherein each of the first and second layers includes a plurality of elongated hollow hexagonal cells wherein the first and second layers are interconnected by an intermediate plate that closes a first adjacent end of the first layer and a second adjacent end of the second layer wherein the intermediate plate forms a pyramidal structure having three sides that project into each individual cell of the first and second layers wherein each pyramidal structure forms an apex that is located substantially in a centered position with a respective cell and each pyramidal structure includes a jagged hexagonal base formed by an intersection of a corresponding six walls of the respective cell and the three sides of the pyramidal structure and wherein the six walls of the respective cell intersect at various points and form three apexes on an opposite side of the intermediate plate in an opposite layer.

11. An energy absorbing device according to claim 10 further comprising a hydraulic energy absorber element including a cylinder carrying a first plate and a piston rod engaging the cylinder and carrying a second plate wherein the plates are movable relative to one another, and wherein the one-piece celled block includes an opening that receives the hydraulic energy absorber element and extends between the first and second plates.

\* \* \* \* \*